(12) United States Patent
Erb et al.

(10) Patent No.: US 8,406,960 B2
(45) Date of Patent: Mar. 26, 2013

(54) VEHICLE SAFETY SYSTEM

(75) Inventors: Yannick Erb, Timis (RO); Yann Le Merrer, Paris (FR); Peter Hardå, Göteborg (SE); Andreas Wallin, Billdal (SE)

(73) Assignee: Autoliv Development AB, Vargarda (SE)

( * ) Notice: Subject to any disclaimer, the term of this patent is extended or adjusted under 35 U.S.C. 154(b) by 309 days.

(21) Appl. No.: 12/812,818

(22) PCT Filed: Jan. 28, 2008

(86) PCT No.: PCT/SE2008/050094
§ 371 (c)(1),
(2), (4) Date: Dec. 7, 2010

(87) PCT Pub. No.: WO2009/096826
PCT Pub. Date: Aug. 6, 2009

(65) Prior Publication Data
US 2011/0071732 A1    Mar. 24, 2011

(51) Int. Cl.
*B60R 21/015* (2006.01)
(52) U.S. Cl. ............... 701/45; 701/36; 280/735
(58) Field of Classification Search .......... 701/36, 701/45, 46, 70, 110; 340/439, 438, 440, 340/429, 472, 903; 280/734–736; 180/268–273
See application file for complete search history.

(56) References Cited

U.S. PATENT DOCUMENTS

| | | | |
|---|---|---|---|
| 6,694,225 B2 * | 2/2004 | Aga et al. | 701/1 |
| 6,856,868 B1 * | 2/2005 | Le et al. | 701/38 |
| 7,526,382 B2 * | 4/2009 | Gleacher et al. | 701/301 |
| 7,734,394 B2 * | 6/2010 | Williams | 701/45 |
| 2005/0017487 A1 | 1/2005 | Andres | |
| 2006/0190176 A1 | 8/2006 | Gleacher | |
| 2006/0253239 A1 | 11/2006 | Williams | |

FOREIGN PATENT DOCUMENTS

DE     10 2005 038 227 A1    2/2007

OTHER PUBLICATIONS

PCT/SE2008/050094—International Search Report—Jul. 10, 2008.

* cited by examiner

*Primary Examiner* — Richard M. Camby
(74) *Attorney, Agent, or Firm* — Brinks Hofer Gilson & Lione

(57) ABSTRACT

A vehicle safety system comprising: at least one occupant safety device (6) for protecting an occupant of the vehicle (1) in the event of a side impact; and a control unit (7) operable to receive information from one or more vehicle sensors (2, 3, 4, 5) and to provide a trigger signal to activate the occupant safety device (6). Under normal driving conditions, a default deployment algorithm is used by the control unit (7) to determine whether the trigger signal should be generated; and if it is determined that loss of control of the vehicle (1) is occurring, or is expected to occur, and the longitudinal speed of the vehicle (1) exceeds a first threshold, the control unit (7) employs a first further deployment algorithm to determine whether the trigger signal should be generated. The first further deployment algorithm being adapted to cause the trigger signal to be generated a shorter time after the initiation of a side impact than is the case for the default deployment algorithm.

18 Claims, 1 Drawing Sheet

VEHICLE SAFETY SYSTEM

CROSS REFERENCE TO RELATED APPLICATIONS

This application claims priority to PCT international patent application PCT/SE2008/050094 filed Jan. 28, 2008.

FIELD OF THE INVENTION

This invention relates to a vehicle safety system, and in particular concerns a system for protecting vehicle occupants during various types of crash situation.

BACKGROUND OF THE INVENTION

While most vehicles are typically equipped with safety devices to protect vehicle occupants in the event of a side impact occurring. In general, in a sideways direction the distance between a vehicle occupant and the exterior of the vehicle is relatively small, since the sides of the vehicle are thin. It is therefore important that safety devices, such as internal side air-bags, which are adapted to protect occupants during side impacts, are activated at the earliest possible stage.

In some instances, it is possible to detect that a side impact is imminent, for instance by using radar or lidar detection, and to activate one or more appropriate vehicle safety systems before the impact has occurred. In other circumstances, impact sensors are used to detect side impacts, and hence deployment of the vehicle safety systems will not occur until the impact has actually happened.

Deployment of the safety systems will be controlled by an on-board processor, in accordance with a deployment algorithm. There are, however, competing priorities which must be taken into account when formulating the algorithm. On the one hand, as discussed above, the relevant side impact safety systems must be activated as swiftly as possible in the event of a crash situation occurring. On the other hand, the algorithm must be robust against "false positive" determinations, which could lead to the side impact safety systems being deployed unnecessarily. Such situations may include the door of a vehicle being slammed with above average force, and low-impact crashes that are unlikely to cause harm to vehicle occupants. It will therefore be understood that deployment algorithms are generally a compromise between these two competing priorities.

It is an object of the present invention to seek to provide an improved safety system of this type.

Accordingly, one aspect of the present invention provides a vehicle safety system comprising: at least one occupant safety device for protecting an occupant of the vehicle in the event of a side impact; and a control unit operable to receive information from one or more vehicle sensors and to provide a trigger signal to activate the occupant safety device, wherein: under normal driving conditions, a default deployment algorithm is used by the control unit to determine whether the trigger signal should be generated; and if it is determined that loss of control of the vehicle is occurring, or is expected to occur, and the longitudinal speed of the vehicle exceeds a first threshold, the control unit employs a first further deployment algorithm to determine whether the trigger signal should be generated, the first further deployment algorithm being adapted to cause the trigger signal to be generated a shorter time after the initiation of a side impact than is the case for the default deployment algorithm.

Advantageously, it is determined that loss of control of the vehicle is occurring, or is expected, if it is determined that the vehicle is undergoing one or more of understeer, oversteer, a lateral skid, avoidance manoeuvring, emergency braking, and departure from the road on which the vehicle is travelling.

Preferably, the control unit is provided with criteria for evaluating whether one or more of understeer, oversteer, lateral skid avoidance manoeuvring, emergency braking, or road departure are occurring, from signals generated by the one or more vehicle sensors.

Conveniently, a second further deployment algorithm is adopted if both the longitudinal and lateral speeds of the vehicle exceed respective thresholds, and it is determined that loss of control of the vehicle is occurring, or is expected to occur.

Advantageously, the second further deployment algorithm is adapted to cause the trigger signal to be generated a shorter time after the initiation of a side impact than is the case for the first alternative deployment algorithm.

Preferably, the preset threshold for vehicle speed is between 5 and 20 km/h.

Conveniently, the preset threshold is 15 km/h.

Another aspect of the present invention provides a method of controlling an occupant safety device of a vehicle for protecting an occupant of the vehicle in the event of the side impact, the method comprising the steps of: receiving information from one or more vehicle sensors; and analysing the signals in accordance with a deployment algorithm and providing a trigger signal to activate the occupant safety device if it is determined that activation of the safety device is necessary, wherein: under normal driving conditions, a default deployment algorithm is employed to determine whether the trigger signal should be generated; and if it is determined that loss of control of the vehicle is occurring, or is expected to occur, and the longitudinal speed of the vehicle exceeds a first threshold, employing a first further deployment algorithm to determine whether the trigger signal should be generated, the first further deployment algorithm being adapted to cause a trigger signal to be generated a shorter time after the initiation of a side impact than is the case for the default deployment algorithm.

A further aspect of the invention provides a computer program comprises computer program code adapted to perform all of the steps as claimed above wherein the program is run on a computer.

Another aspect of the invention provides a computer program as claimed above is embodied on a computer readable medium

BRIEF DESCRIPTION OF THE DRAWINGS

In order that the present invention may be more readily understood, embodiments thereof will now be described, by way of example, with reference to the accompanying drawings, in which.

DETAILED DESCRIPTION OF THE INVENTION

Figure 1:
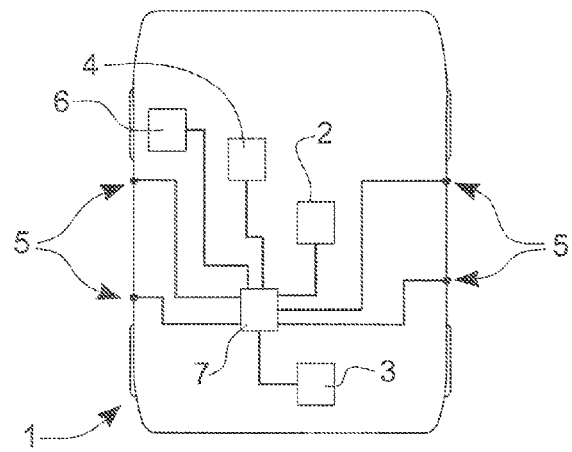
FIG. 1 is a schematic view of a vehicle having a safety system embodying the present invention.

With reference firstly to FIG. 1, a schematic view of a vehicle 1 is shown. As is known in the art, the vehicle 1 is provided with a number of sensors which are adapted to sense position, movement and control of the vehicle 1. These sensors include a set of accelerometers 2, to measure acceleration $a_x$ of the vehicle 1 in the longitudinal direction x, $a_y$ in the lateral direction y, and $a_z$ in the vertical direction (pointing directly away from the page in FIG. 1). The speed of the vehicle 1 in various directions can also be determined from outputs from these accelerometers 2, and the longitudinal $v_x$ of the vehicle can be derived from the speedometer. The accelerometers 2 also include a yaw sensor to measure the yaw rate $\omega_z$. A GPS or other positioning system 3 is provided to determine the position of the vehicle 1 on the Earth's surface. Sensors 4 are further provided to detect the angle α of the steering wheel, the angle β of the throttle, and the brake pressure p that is applied to a brake pedal of the vehicle 1.

Side impact sensors 5 are mounted along the sides of the vehicle 1, and are each configured to output a signal which is indicative of the lateral acceleration of the sensor 5.

The vehicle 1 also comprises one or more safety devices, such as a side air-bag 6, to protect a vehicle occupant in the event of a side impact. A control unit 7, which comprises one or more processors, interprets signals output by the sensors 2, 3, 4, 5 and determines whether the safety devices should be triggered.

Using the information derived from some or all of these sensors 2, 3, 4, 5 it is possible to make a determination as to whether the vehicle 1 is in a situation where it is likely to be involved in a harmful side impact. In particular, such an impact is more likely to occur where control of the vehicle has been lost, or appears likely to be lost. Such a situation may be indicated by understeer of the vehicle 1, by oversteer of the vehicle 1, or by lateral slip of the vehicle 1 (i.e. where the vehicle 1 skids in a lateral direction). Loss of control may also be occurring, or be likely to occur, if the vehicle 1 is undergoing avoidance manoeuvring or emergency braking, or if it appears that the vehicle 1 has left the road on which it is travelling.

If any of these conditions are met, the likelihood of the vehicle 1 being involved in a harmful side impact is increased. In addition, the likelihood of a harmful side impact occurring is increased if the longitudinal speed of the vehicle 1 is relatively high. For instance, if the vehicle's speed is in excess of 5 km/h, and particularly if the speed is in excess of 15 km/h, it may be determined that the likelihood of harmful impact is high. The lowest limit is chosen so that, below this speed, even if a side impact occurs the probability of vehicle occupants being harmed is low.

Vehicle safety systems embodying the present invention comprise a default deployment algorithm, which is adapted to interpret data from at least the side impact sensors 5 and make a determination as to whether one or more safety devices should be deployed to protect an occupant of the vehicle from a side impact. Depending on the type of a particular safety device, the algorithm may also determine the mode in which the safety device is activated. This default deployment algorithm may be similar to conventional deployment algorithms, and may cause deployment of the safety device if the integrated lateral acceleration exceeds a threshold $Th_3$.

The vehicle's control unit 7 also comprises at least a first further deployment algorithm, which is used when it is determined that the likelihood of the vehicle 1 being involved in a harmful side impact is high. If such a determination is made, then the threshold for integrated lateral acceleration above which deployment will occur is decreased to a lower value $Th_4$.

In preferred embodiments a second further deployment algorithm is also available, which may be adopted when a determination is made that there is a further increased likelihood of a harmful side impact occurring. When the second further deployment algorithm is used the threshold for integrated lateral acceleration above which deployment will occur is further decreased to a still lower value $Th_5$.

As described above, the threshold $Th_3$ for the default algorithm must be set so that the safety systems is unlikely to be triggered by any inappropriate events, for instance the violent slamming of a door of the vehicle 1, or a low-impact crash that is unlikely to cause harm to any occupants of the vehicle 1.

However, if it is determined that the vehicle 1 is in a situation where a harmful side impact appears to be likely, it is possible to lower the threshold against which integrated value of the lateral acceleration of the impact sensor 5 is compared, as the benefit obtained from early triggering of safety systems will outweigh the potential risk of the safety systems being triggered erroneously.

For instance, if the driver of the vehicle 1 attempts to negotiate a sharp corner at too high a speed, the vehicle 1 may skid sideways off the road. In this case, the control unit 7 may determine, from information output by the vehicle's sensors 2, 3, 4, one or more of: that an understeer situation has occurred; that the vehicle is involved in lateral slip; and that the vehicle has left the road. In such circumstances, the vehicle 1 may travel in a generally sideways direction at relatively high speed, and there is a large danger that the vehicle 1 may strike a pole, tree or similar object, and that such an impact would be harmful to vehicle occupants.

Under these circumstances, the risk of events such as the slamming of a door of the vehicle, which might lead to erroneous triggering of the safety systems, is very small.

In preferred embodiments of the invention, the first further deployment algorithm is adopted in situations where loss of control of the vehicle 1 has occurred, or is expected to occur, and where the vehicle's longitudinal speed exceeds a preset safe longitudinal speed threshold $Th_1$.

In advantageous embodiments, the second further deployment algorithm is used in situations where loss of control of the vehicle has occurred, or is expected to occur, and where both the vehicle's longitudinal and lateral speed exceed preset safe thresholds $Th_1$, $Th_2$.

Figure 2:
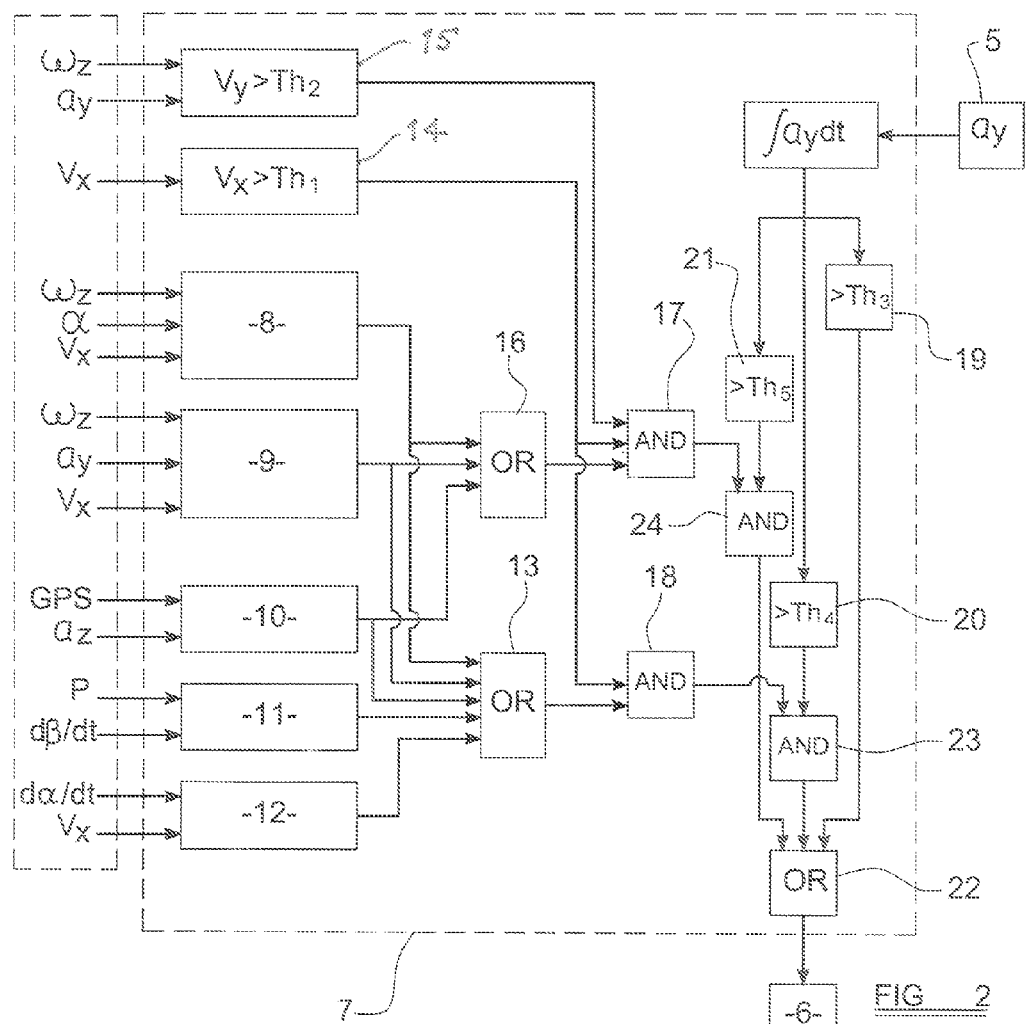
FIG. 2 is a schematic view of a decision-making process for a system embodying the present invention.

With reference to FIG. 2, a schematic view of the decision-making process to decide which deployment algorithm to employ is shown.

The decision making process includes several decision-making elements which are adapted to provide a determination as to whether a particular vehicle behaviour, which may be indicative of loss of vehicle control or likely loss of vehicle control, is occurring.

An oversteer/understeer decision-making element 8 may receive inputs from one or all of the yaw rate sensor 2, the steering wheel angle sensor 4, and information regarding the longitudinal speed of the vehicle 1, to reach a determination that the vehicle 1 is understeering or oversteering.

A body slip decision-making element 9 may take information from one or all of the yaw rate sensor 2, the sensed acceleration of the vehicle 1 in a lateral direction, and the longitudinal speed of the vehicle 1, to reach a determination as to whether the vehicle 1 is undergoing a sideways skid.

A road departure decision-making element 10 receives information from one or both of the positioning system 4, and vertical acceleration $a_z$ of the vehicle 1, to make a determination as to whether the vehicle 1 has left the road on which it is travelling.

An emergency braking decision-making element 11 receives information from one or both of the brake pressure p that is applied to a brake pedal of the vehicle, and the rate of change of the angle β of the throttle pedal, to arrive at a determination as to whether the driver of the vehicle 1 is performing an emergency braking manoeuvre.

An avoidance manoeuvring decision-making element 12 has as input one or both of a rate of change of the steering wheel angle α, and the longitudinal speed of the vehicle 1, to reach a determination as to whether the driver of the vehicle 1 is performing an avoidance manoeuvring procedure.

Any combination of some of these criteria may be used and the invention is not limited to considering all of these criteria.

The outputs from each of these decision-making elements 8, 9, 10, 11, 12 are input to a first OR element 13 which provides a positive output if any of the decision-making units 8, 9, 10, 11, 12 provides a positive output, indicating that the vehicle conditions relating to that decision-making element 8, 9, 10, 11, 12 are satisfied.

In addition, a longitudinal speed decision-making element 14 receives information regarding the longitudinal speed of the vehicle 1, and compares this value with the safe longitudinal speed threshold $Th_1$, to arrive at a determination as to whether the longitudinal speed of the vehicle 1 is above a preset safe level.

A lateral speed decision-making element 15 receives information regarding the yaw rate $\omega_z$ of the vehicle, as well as the acceleration $a_y$ of the vehicle 1 in the lateral direction y, to reach a determination as to whether the lateral speed of the vehicle 1 exceeds the safe lateral speed threshold $Th_2$.

The longitudinal and lateral speed decision-making elements 14, 15 each give a positive output if it is determined that either of these speeds exceed the respective safe thresholds $Th_1$, $Th_2$.

Outputs from the understeer/oversteer decision-making element 8, the body slip decision-making element 9 and the road departure decision-making element 10 are fed into a second OR element 16.

Outputs from the longitudinal and lateral speed decision-making elements 14 and 15, as well as the output from the second OR element 16, are inputted into a first AND element 17, whose output will be positive if each of the three inputs is positive. The output from the longitudinal speed decision-making element 14 and the first OR element 13 are inputted into a second AND element 18, which once again will only provide a provide output if both of the inputs are positive.

Integrated data from a side impact sensor 5, or from one or more other suitable sensors, is fed to three separate comparators 19, 20, and 21, which each compare the integrated lateral acceleration $a_y$ against respective thresholds. The first comparator 19 compares the integrated acceleration with the threshold $Th_3$ of the default algorithm. The second comparator 20 compares the integrated acceleration against the lowered threshold $Th_4$ which is used by the further deployment algorithm. The third comparator 21 compares the integrated acceleration against a further lowered threshold $Th_5$ which is used by the second further deployment algorithm.

A third OR element 22 is provided, which has three inputs. If any of the inputs to the third OR element 22 are positive, the third OR element 22 will output a positive signal, which will trigger the deployment of the side air-bag 6.

If the integrated lateral acceleration $a_y$ determined by the first comparator 19 is in excess of the threshold $Th_3$ used by the default deployment algorithm, this will provide a positive input to the third OR element 22. Thus, if the integrated lateral acceleration $a_y$ exceeds this default threshold $Th_3$, the side air-bag 6 will be triggered irrespective of the outputs from any other sensors.

The output from the second comparator 20 will be positive if it is determined by the second comparator 20 that the integrated lateral acceleration $a_y$ exceeds the lowered threshold $Th_4$ used by the first further deployment algorithm. The output from the second comparator 20 is inputted into a third AND element 23, which also has as an input the output of the second AND element 18. The output of the third AND element 23 provides an input to the third OR element 22. It will therefore be understood that, if the integrated lateral acceleration $a_y$ exceeds the lowered threshold $Th_4$ used by the first further deployment algorithm, and the longitudinal speed $v_x$ of the vehicle exceeds the appropriate safe threshold $Th_1$, and it is determined that the vehicle is undergoing one or more of understeering/oversteering, body slip, road departure or emergency braking or avoidance, the side air-bag 6 will be triggered.

The output of the third comparator 21 is fed to a fourth AND element 24, which also has as an input the output from the first AND element 17.

Thus, it will be understood that if the integrated lateral acceleration $a_y$ exceeds the further lowered threshold $Th_5$ used by the second further deployment algorithm, and the respective safe thresholds $Th_1$, $Th_2$ for longitudinal and lateral speed are both exceeded, and it is determined that one of oversteer/understeer, body slip, or road departure is occurring, then the side air-bag 6 will be triggered.

As discussed above, when the first or second further deployment algorithm is used, the threshold against which the integrated lateral acceleration $a_y$ is compared is lowered, so that in effect the further deployment algorithms are more sensitive to potential side impacts, with the result that safety systems will be activated at an earlier stage in the event of a real side impact.

In general, it will be understood that any number of different further deployment algorithms may be used, in which a lowered threshold is used to determine the level of integrated lateral acceleration (or indeed any other quantity) which must be detected if a safety device is to be triggered, with various additional criteria that must also be satisfied.

If it is determined that the vehicle 1 is in a situation in which a harmful side impact is likely, but no side impact occurs and the vehicle 1 reaches a halt safely, or resumes travelling in a safe manner, the conditions described above will no longer be met, and it will be determined that the vehicle 1 is no longer in a situation where a harmful side impact is likely. In this case, therefore, the default deployment algorithm for side-impact safety systems will once again be used.

In the embodiments described above, the further deployment algorithms are made more sensitive to potential side impacts by reducing the threshold against which the integrated lateral acceleration $a_y$ is compared. However, the invention is not limited to this, and any appropriate threshold or criterion for assessing the likelihood that a side impact is occurring, or is likely to occur, may be reduced or adapted to make the further deployment algorithm more sensitive to side impacts.

It will be understood that embodiments of the present invention will provide a flexible system for triggering side-impact safety systems in the most appropriate manner depending on the circumstances, which may lead to a significant improvement in passenger safety.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A vehicle safety system for a vehicle comprising:
   at least one occupant safety device (6) for protecting an occupant of the vehicle (1) in the event of a side impact; and
   a control unit (7) operable to receive information from one or more vehicle sensors (2, 3, 4, 5) and to provide a trigger signal to activate the occupant safety device (6), wherein:
   under normal driving conditions, a default deployment algorithm is used by the control unit (7) to determine whether the trigger signal should be generated; and
   if it is determined by the control unit (7) that a loss of control of the vehicle (1) is occurring, or is expected to occur, and the longitudinal speed of the vehicle (1) exceeds a first threshold, the control unit (7) employs a first further deployment algorithm to determine whether the trigger signal should be generated, the first further deployment algorithm being adapted to cause the trigger signal to be generated a shorter time after the initiation of a side impact than is the case for the default deployment algorithm.

2. A system according to claim 1, in which the control unit (7) determines that loss of control of the vehicle (1) is occurring, or is expected, when the vehicle (1) is undergoing one or more of understeer, oversteer, a lateral skid, avoidance manoeuvring, emergency braking, and departure from the road on which the vehicle (1) is travelling.

3. A system according to claim 2, wherein the control unit (7) is provided with criteria for evaluating whether one or more of understeer, oversteer, lateral skid avoidance manoeuvring, emergency braking, or road departure are occurring, from signals generated by the one or more vehicle sensors (2, 3, 4, 5).

4. A system according to claim 1, wherein a second further deployment algorithm is adopted if both the longitudinal and lateral speeds of the vehicle (1) exceed respective thresholds, and it is determined that loss of control of the vehicle (1) is occurring, or is expected to occur.

5. A system according to claim 4, wherein the second further deployment algorithm is adapted to cause the trigger signal to be generated a shorter time after the initiation of a side impact than is the case for the first further deployment algorithm.

6. A system according to claim 1, wherein the first threshold for the vehicle longitudinal speed is between 5 and 20 km/h.

7. A system according to claim 1, in which the first threshold for the vehicle longitudinal speed is about 15 km/h.

8. A method of controlling an occupant safety device (6) of a vehicle (1) for protecting an occupant of a vehicle (1) in the event of the side impact, the method comprising the steps of:
   receiving signals from one or more vehicle sensors (2, 3, 4, 5); and
   analysing the signals in accordance with a deployment algorithm and providing a trigger signal to activate the occupant safety device (6) if it is determined that activation of the safety device (6) is necessary, wherein:
   under normal driving conditions, a default deployment algorithm is employed to determine whether the trigger signal should be generated; and
   if it is determined that loss of control of the vehicle (1) is occurring in the step of analyzing the signals, or is expected to occur, and the longitudinal speed of the vehicle (1) exceeds a first threshold, employing a first further deployment algorithm to determine whether the trigger signal should be generated, the first further deployment algorithm being adapted to cause the trigger signal to be generated a shorter time after the initiation of a side impact than is the case for the default deployment algorithm.

9. A method in accordance with claim 8 in which all of the steps of claim 8 are caused to occur by computer program code when the program is run on a computer.

10. A method according to claim 9, in which the computer program code is embodied on a computer readable medium.

11. A method in accordance with claim 8 in which the first threshold for the vehicle longitudinal speed is between 5 and 20 km/h.

12. A method in accordance with claim 8 in which in which the first threshold for the vehicle longitudinal speed is about 15 km/h.

13. A method according to claim 8, wherein the step of analyzing the signals uses the default deployment algorithm when an integrated lateral acceleration of the vehicle exceeds a first lateral acceleration threshold ($Th_3$).

14. A method according to claim 13, wherein the step of analyzing the signals uses the first further deployment algorithm when an integrated lateral acceleration of the vehicle exceeds a second lateral acceleration threshold ($Th_4$) which is lower than the first lateral acceleration threshold ($Th_3$).

15. A method according to claim 14, wherein the step of analyzing the signals uses a second further deployment algorithm when an integrated lateral acceleration of the vehicle exceeds a third lateral acceleration threshold ($Th_5$) which is lower than the second lateral acceleration threshold ($Th_4$) wherein the second further deployment algorithm is adapted to cause the trigger signal to be generated a shorter time after the initiation of a side impact than is the case for the first further deployment algorithm.

16. A system according to claim 2, wherein the control unit uses the default deployment algorithm when an integrated lateral acceleration of the vehicle exceeds a first lateral acceleration threshold ($Th_3$).

17. A system according to claim 16, wherein the control unit uses the first further deployment algorithm when an integrated lateral acceleration of the vehicle exceeds a second lateral acceleration threshold ($Th_4$) which is lower than the first lateral acceleration threshold ($Th_3$).

18. A system according to claim 17, wherein the control unit uses a second further deployment algorithm when an integrated lateral acceleration of the vehicle exceeds a third lateral acceleration threshold ($Th_5$) which is lower than the second lateral acceleration threshold ($Th_4$) wherein the second further deployment algorithm is adapted to cause the trigger signal to be generated a shorter time after the initiation of a side impact than is the case for the first further deployment algorithm.

* * * * *

UNITED STATES PATENT AND TRADEMARK OFFICE
CERTIFICATE OF CORRECTION

PATENT NO.       : 8,406,960 B2                                         Page 1 of 1
APPLICATION NO.  : 12/812818
DATED            : March 26, 2013
INVENTOR(S)      : Erb et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 441 days.

Signed and Sealed this
First Day of September, 2015

Michelle K. Lee
*Director of the United States Patent and Trademark Office*